United States Patent [19]
Hallinan et al.

[11] 3,846,534
[45] Nov. 5, 1974

[54] METHOD OF MAKING A CAST POLYESTER RESIN STRUCTURE HAVING A CORE OF LOW GRADE MATERIAL

[76] Inventors: John N. Hallinan, 4444 S.W. Greenleaf Dr., Portland, Oreg. 97221; William F. Costner, 19515 S. Fisher's Mill Rd., Oregon City, Oreg. 97045

[22] Filed: Sept. 24, 1971

[21] Appl. No.: 183,421

[52] U.S. Cl............... 264/225, 264/275, 264/279
[51] Int. Cl........................................... B29c 1/02
[58] Field of Search .......... 264/220, 225, 226, 328, 264/275, 278

[56] References Cited
UNITED STATES PATENTS

| | | | |
|---|---|---|---|
| 2,316,143 | 4/1943 | Peebles | 264/226 X |
| 2,344,206 | 3/1944 | Forni | 264/278 X |
| 2,632,922 | 3/1953 | Kish | 264/225 X |
| 2,682,111 | 6/1954 | Kish | 264/275 X |
| 3,088,174 | 5/1963 | Kolt | 264/328 X |
| 3,109,201 | 11/1963 | Dulmage | 264/275 X |
| 3,298,894 | 1/1967 | Barnette | 264/275 X |
| 3,328,500 | 6/1967 | Barnette | 264/275 X |
| 3,641,228 | 2/1972 | Fleck | 264/225 |

*Primary Examiner*—Jeffrey R. Thurlow
*Assistant Examiner*—Thomas P. Pavelko
*Attorney, Agent, or Firm*—Stephen W. Blore

[57] ABSTRACT

A method of making a cast polyester resin structure includes making a master of a desired configuration from a fine quality wood having a desired surface grain texture. A mold is made from the master using a molding compound suitable for picking up surface details thereof. A core of low grade material is made generally in the shape of the master, but has elements of lesser cross-sectional area. Polyester resin of a desired color is poured into the mold, and the core is then placed in the resin with the surfaces of the core in a desired spaced relation with respect to the walls of the mold cavity. The core is weighted down in the resin to a desired level, and the resin is then set up to gel and form a hardened resin cover layer about the core.

1 Claim, 9 Drawing Figures

PATENTED NOV 5 1974
3,846,534
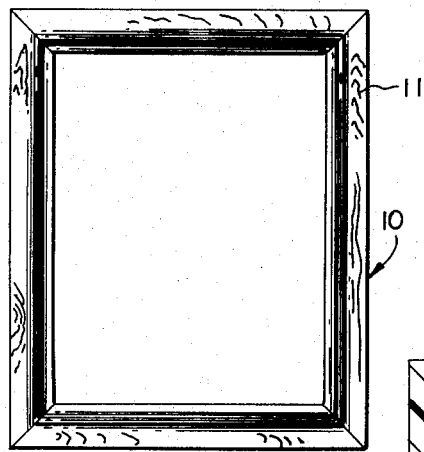
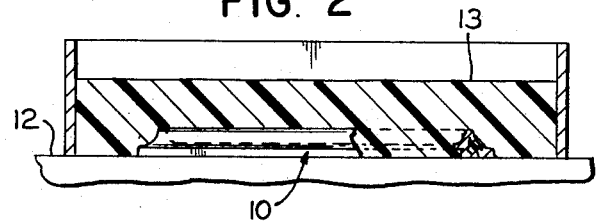
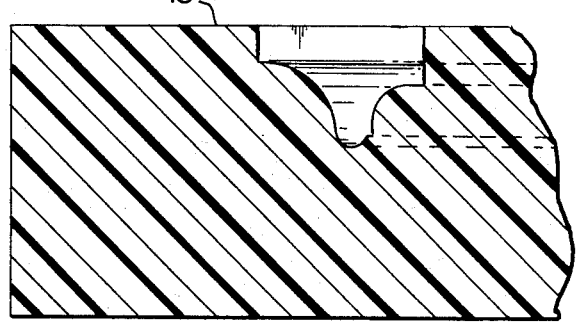
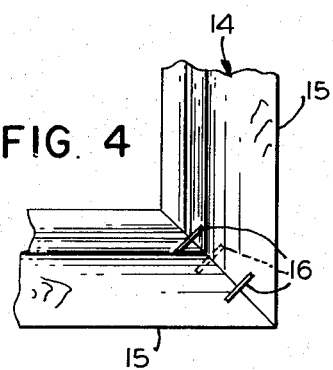
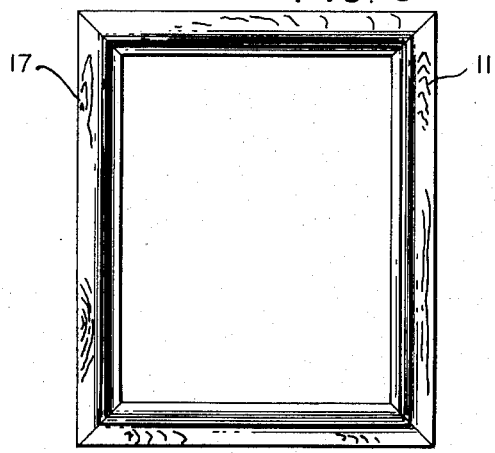
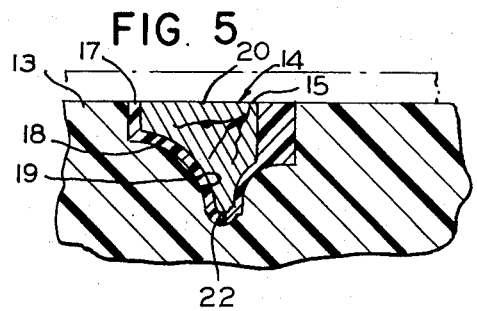
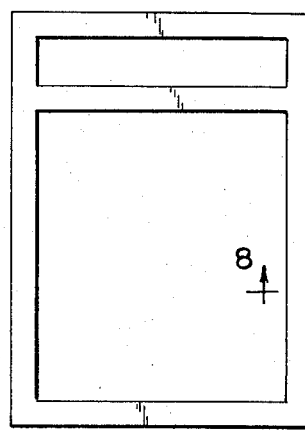
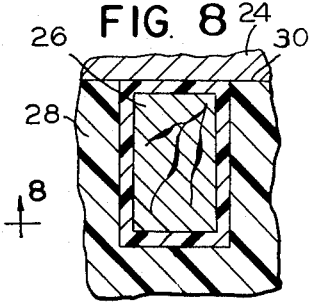
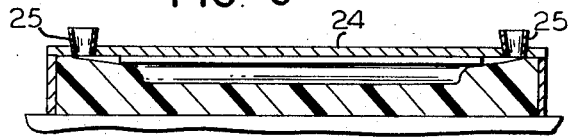
WILLIAM F. COSTNER
JOHN N. HALLINAN
INVENTORS.
BY
BUCKHORN, BLORE, KLARQUIST & SPARKMAN
ATTORNEYS

METHOD OF MAKING A CAST POLYESTER RESIN STRUCTURE HAVING A CORE OF LOW GRADE MATERIAL

BACKGROUND OF THE INVENTION

This invention relates to a method of making cast polyester resin structures and, more particularly, to a method of making such structures having a core of relatively low grade material.

Kitchen and bathroom cabinet frames, closet and cabinet door frames, picture frames and similar structures are typically made from wood. Where the ultimate consumer desires a frame made of a fine quality wood, or one having a visible surface grain texture, the product is quite costly as the supply of such materials is limited. Wood frames are also costly to build inasmuch as they require a relatively large amount of skilled labor.

Besides their cost, wood frames are subject to many disadvantages. A wood frame is often likely to split during the course of its manufacture. Wood swells and workmen differ in their skill, and thus wood frames differ in size even when made to exacting specifications. When wood is to be painted, a wood frame requires a number of coats in order to avoid regions of varying color intensity. Finally, if the paint chips from the frame during service, the resulting mar is relatively apparent since the color of the wood is generally dissimilar to that of the paint.

Polyester resin plastic is also a relatively expensive material. However, it is subject to less disadvantages than wood. Once a suitable mold is constructed, polyester can be cast to form structures of precisely uniform size which are not subject to splitting or swelling, and which will have an absolutely uniform surface texture for the application of subsequent finishes.

Accordingly it is the primary object of the present invention to provide a method of making a cast polyester resin structure wherein a polyester resin plastic is combined with a material of lesser cost, so that the total cost of the resulting structure is markedly reduced without detracting from its ultimate appearance.

It is a further object of the present invention to provide a cast polyester resin structure having a core of low grade material by a method that will be quick and efficient and which will reduce the amount of labor heretofore required to make similar structures from wood.

It is a further object of the present invention to provide such a structure that will be reproduceable in substantially identical sizes and which will not be subject to the various disadvantages inherent in wood structures.

SUMMARY OF THE INVENTION

The method of the present invention comprises making a master structure, such as a frame, of a desired configuration from wood having a desired surface grain texture. A molding compound suitable for picking up the surface grain texture of the master is then poured around and over the master to form an open top mold.

A core is then made generally in the shape of the master, but with elements of lesser cross-sectional area. A material is used which is lower in quality and hence, lower in cost than polyester resin.

Polyester resin of a desired color is poured into the mold and the core is placed in the resin to a desired level.

The resin is set up to gel and form a hardened cover layer about the core. When the final structure is painted or stained, it is indistinguishable from the master, reproducing in precise detail the surface grain configuration.

BRIEF DESCRIPTION OF THE DRAWINGS

FIG. 1 is a view of a master frame which is to be duplicated.

FIG. 2 is a view of the mold made from the master frame of FIG. 1.

FIG. 3 is a cross-sectional view to an enlarged scale through the mold shown in FIG. 2.

FIG. 4 is a view of the core.

FIG. 5 is a view of the core in position in the mold.

FIG. 6 is a view of the final structure.

FIG. 7 is a view of a different type of frame suitably made by an alternate embodiment of the method of the invention.

FIG. 8 is a sectional view taken on line 8—8 of FIG. 7.

FIG. 9 is a sectional view through the mold of the alternate embodiment.

DETAILED DESCRIPTION OF THE PREFERRED EMBODIMENTS

Referring to the drawings, the method of the present invention is illustrated in the making of a frame suitable for use as a picture frame or for use as a frame for a door for a small cabinet or closet.

A master frame 10 is first made from a fine quality wood, such as mahogany or ash, having a surface grain texture 11 which it is desired to reproduce in the final product. The master frame 10 is placed face up on a supporting surface 12, and a molding compound is poured around and over the master to form an open top mold 13. The compound used should be such as can pick up the grain texture of the master, reproducing every detail thereof, even including slight imperfections, seams, juncture lines, etc. in the master. A molding compound suitable for use with the present invention is the tooling epoxy sold under the brand name "Resolyn."

A core 14 generally in the shape of the master frame 10, but having elements 15 of lesser cross-sectional area is made from a material lower in quality and consequently lower in cost than the wood from which the master frame is made. The core 14 may be made from lumber of a grade lower than that used in the master frame, or it may be made from particleboard, or it may even be made from compressed reclaimed paper pulp.

Where a low grade wood is used to make the core, only light staples 16 are needed to hold the members or elements 15 together, inasmuch as the polyester resin, which is ultimately poured therearound, functions as an adhesive to give the structure strength and stability.

A polyester resin 17 in a desired color is poured into the mold 13 to a predetermined level. A resin suitable for the purpose is the polyester resin sold by Ashland Chemical Company under its product No. 77M. Other suitable resins or plastics may be used.

The core 14 is placed in the mold 13 face down and is weighted to sink to a desired level in the liquid polyester. The surfaces 18 of the core 14 are spaced as desired with respect to the walls 19 of the mold cavity. If the ultimate product is to have resin coating its back 20, the core is weighted down to a level such that the resin covers the back. If the resin is not to cover the back, the core is weighted down to a level such that the resin is flush with the back 20. In certain instances, the core 14 may be supported in the mold 13 on elevating pads 22, as for example, when the core is relatively large and there is a danger of an uneven placing in the mold.

At the time the polyester resin is poured in the mold, 1 percent by weight of a solution of 1 part DMA (diamethylamine) and 10 parts of cobalt is added to the resin. Also added at this time is 1 percent by weight of an MEK (methyl ethyl ketone) catalyst to set up the resin and form a gel.

At 70 degrees F. room temperature, the aforesaid additives will cause the resin to set up and form a gel in approximately 1 minute, permitting demolding in approximately 4 minutes. When the resin has hardened sufficiently, the back of the frame may be sanded to remove any unwanted excess material.

If desired and as shown in FIGS. 7, 8 and 9, a top 24 can be placed on the mold, and outlet and inlet sprues 25 provided. In this embodiment a core 26 is placed in the mold 28 and is positioned below the top surface 30, as can be seen by FIG. 8, sufficiently to permit the liquid polyester to completely encase the core 26. The top 24 is placed on the mold so as to insure all sides being smooth. The top is held closed and the polyester resin and additives are injected into the mold under low pressure. This process will achieve a smoother back surface on the resulting frame 32 than the open-top process and will also eliminate overpours. Hence, it is less wasteful of resin.

After it has hardened, the resin frame in both embodiments is painted or stained a color which desirably will not differ appreciably from the color of the resin itself. The paint will generally go on very evenly because the plastic surface is absolutely uniform. It has been found that one coat of paint is usually sufficient. If any paint chips off in service, such chips only down to the underlying plastic. Since this is generally of a color similar to that of the final color of the article, the resulting mar is not too apparent.

A frame made according to the method of the present invention will experience less warpage in the ultimate product than will a wood frame. Since the usual wood frame requires three coats of paint, the drying thereof often results in warpage. This is a problem not experienced in the method of the present invention.

A wood frame is disposed to split due to the connectors used, and the same may happen even after painting. This is not a problem with frames made according to the present invention.

Since wood swells and workmen differ in their skill, wood frames are never identical in size even when made to exact specifications, whereas frames made according to the present invention are always identical.

Where a wood frame is to be stained, the uneven grain inherent in such generally causes an uneven application of the stain. This is also not a problem with frames made according to the method of the present invention.

The most important advantage of frames made according to the instant method, however, is that of cost. The cost of a wood frame is nearly double that of a frame made according to the present invention, the major factor in the difference being the cost of the labor required.

The invention is highly suitable for duplicating picture frames from an expensive hand carved original. Other uses for the invention are in the making of frames for small cabinet doors, such as kitchen and bathroom cabinet doors, and access or cabinet doors for trailers and like vehicles. The invention is also useful in the making of cabinet frames, as for example, frames suitable for the fronts of kitchen and bathroom cabinets. Oval or round frames are also desirably made using the method of the present invention.

The method reproduces even slight imperfections found in the master frame, including seam and juncture lines, as well as the surface grain texture. The resulting product is indistinguishable from the master, even though its cost is appreciably less as hereinabove noted.

We claim:

1. A method of making a cast polyester resin simulated wood frame having an open center and a core of low grade material and which frame will precisely duplicate a given wood master including the surface texture thereof, comprising making a master frame of a desired configuration from wood having a surface texture which it is desired to reproduce;

placing said master face up on a supporting surface;

pouring a molding compound around and over said master to form an open top mold, said molding compound being adapted precisely to pick up said surface texture of said master;

assembling a core structure generally in the shape of said master frame and comprising at least four elements so as to form a frame, said elements being of lesser cross-sectional area than said master frame, said elements being made from a material of lesser cost than polyester resin;

attaching said elements together by staples to form a core;

placing said mold on a casting surface with its open top up;

pouring a mixture of a polyester resin of a desired color and a catalyst into said mold;

then placing said core in the mixture in said mold with the surfaces of said core in a desired spaced relation with respect to the walls of the mold cavity, said core being inserted and weight down in said mixture to a level wherein said mixture rises to the level of the top of said core; and permitting said mixture to gel and form a hardened resin cover layer about said core, the resin reproducing said surface texture of said master frame in precise detail.

* * * * *